United States Patent
Nakano et al.

(10) Patent No.: US 8,461,960 B2
(45) Date of Patent: Jun. 11, 2013

(54) REMOTE CONTROLLING APPARATUS, RECEPTION APPARATUS, AND REMOTE CONTROL METHOD

(75) Inventors: Masahiro Nakano, Tokyo (JP); Takashi Tsurumoto, Saitama (JP)

(73) Assignee: Sony Corporation (JP)

( * ) Notice: Subject to any disclaimer, the term of this patent is extended or adjusted under 35 U.S.C. 154(b) by 598 days.

(21) Appl. No.: 12/322,486

(22) Filed: Feb. 3, 2009

(65) Prior Publication Data

US 2009/0195407 A1    Aug. 6, 2009

(30) Foreign Application Priority Data

Feb. 4, 2008    (JP) .............................. P2008-024337

(51) Int. Cl.
*G09B 21/00*    (2006.01)
*G05B 23/02*    (2006.01)
*G05B 19/00*    (2006.01)
*G08C 19/16*    (2006.01)

(52) U.S. Cl.
USPC ........... 340/4.11; 340/4.3; 340/3.7; 340/5.61; 340/12.22

(58) Field of Classification Search
USPC ............... 340/4.11, 4.3, 4.61, 3.7, 5.61, 12.5, 340/12.52, 12.22, 815.6, 825.69
See application file for complete search history.

(56) References Cited

U.S. PATENT DOCUMENTS

| | | | | |
|---|---|---|---|---|
| 5,909,183 A * | 6/1999 | Borgstahl et al. | .......... | 340/12.29 |
| 5,959,539 A * | 9/1999 | Adolph et al. | ................. | 340/3.5 |
| 6,791,467 B1 * | 9/2004 | Ben-Ze'ev | ................. | 340/12.25 |
| 7,345,593 B2 * | 3/2008 | Park et al. | ..................... | 340/4.37 |
| 2004/0068756 A1 * | 4/2004 | Chiu | ............................. | 725/135 |
| 2005/0253682 A1 * | 11/2005 | Kato et al. | ...................... | 340/3.7 |
| 2006/0006984 A1 * | 1/2006 | Takahashi | .................... | 340/5.61 |
| 2006/0028557 A1 | 2/2006 | Watanabe | | |
| 2007/0106921 A1 * | 5/2007 | Jin et al. | ........................ | 713/502 |
| 2009/0132728 A1 * | 5/2009 | Fukui et al. | ...................... | 710/8 |

FOREIGN PATENT DOCUMENTS

JP    2006-135930 A    5/2006

* cited by examiner

*Primary Examiner* — Brian Zimmerman
*Assistant Examiner* — Omeed Alizada
(74) *Attorney, Agent, or Firm* — Lerner, David, Littenberg, Krumholz & Mentlik, LLP

(57) ABSTRACT

A remote control apparatus is disclosed, which radio transmits a control command from a remote controller to a reception apparatus connected to an electronic device which is an apparatus under control. The reception apparatus stores a first identification information which represents a destination remote controller. When the remote controller issues a pairing start command, the remote control apparatus transmits a pairing request containing second identification information of the remote controller itself. The reception apparatus extracts the second identification information from the received pairing request and decides that the remote controller is a pairing party if the first identification information matches the second identification information. The reception apparatus transmits a pairing response containing third identification information of the reception apparatus itself to the remote controller.

20 Claims, 7 Drawing Sheets

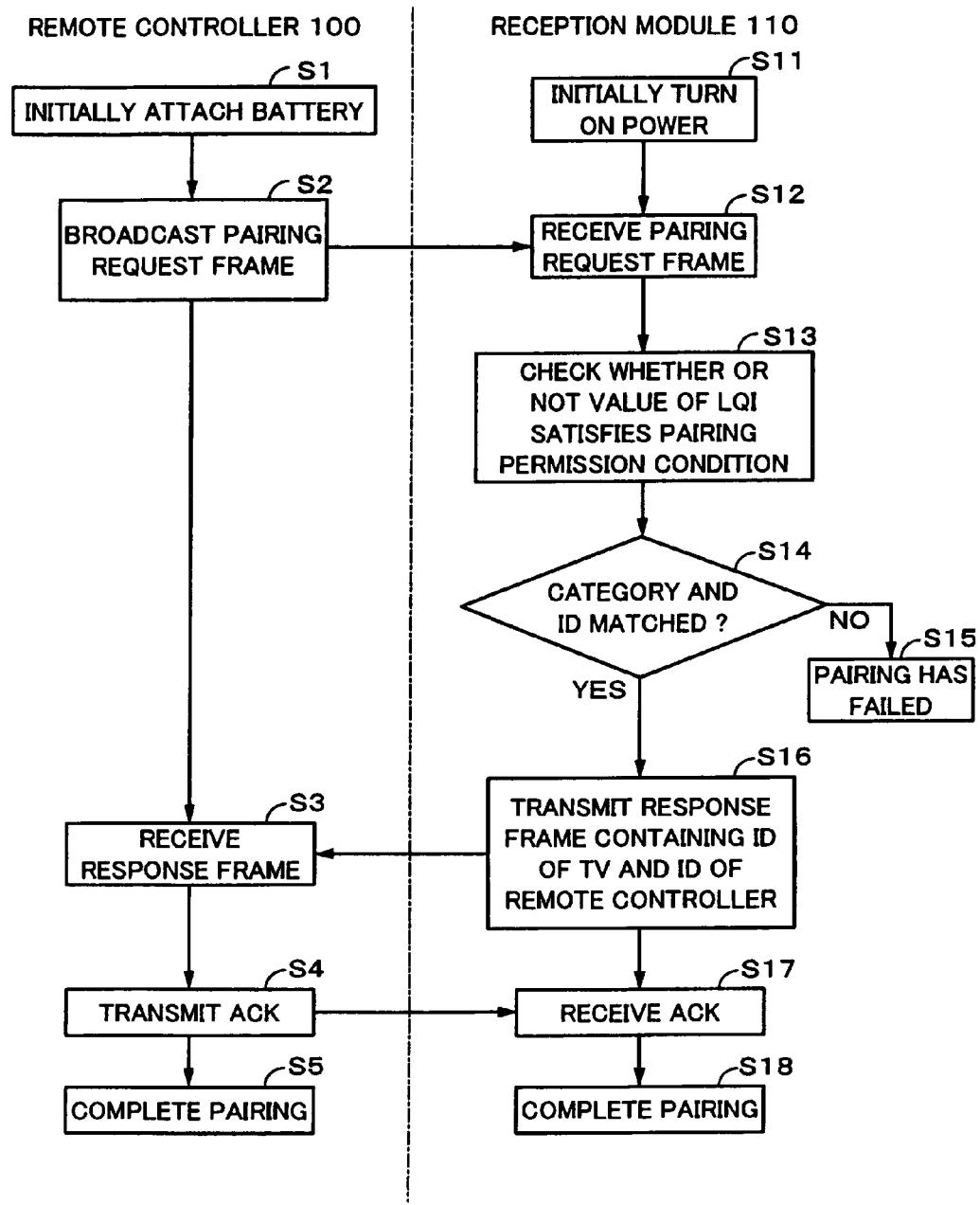

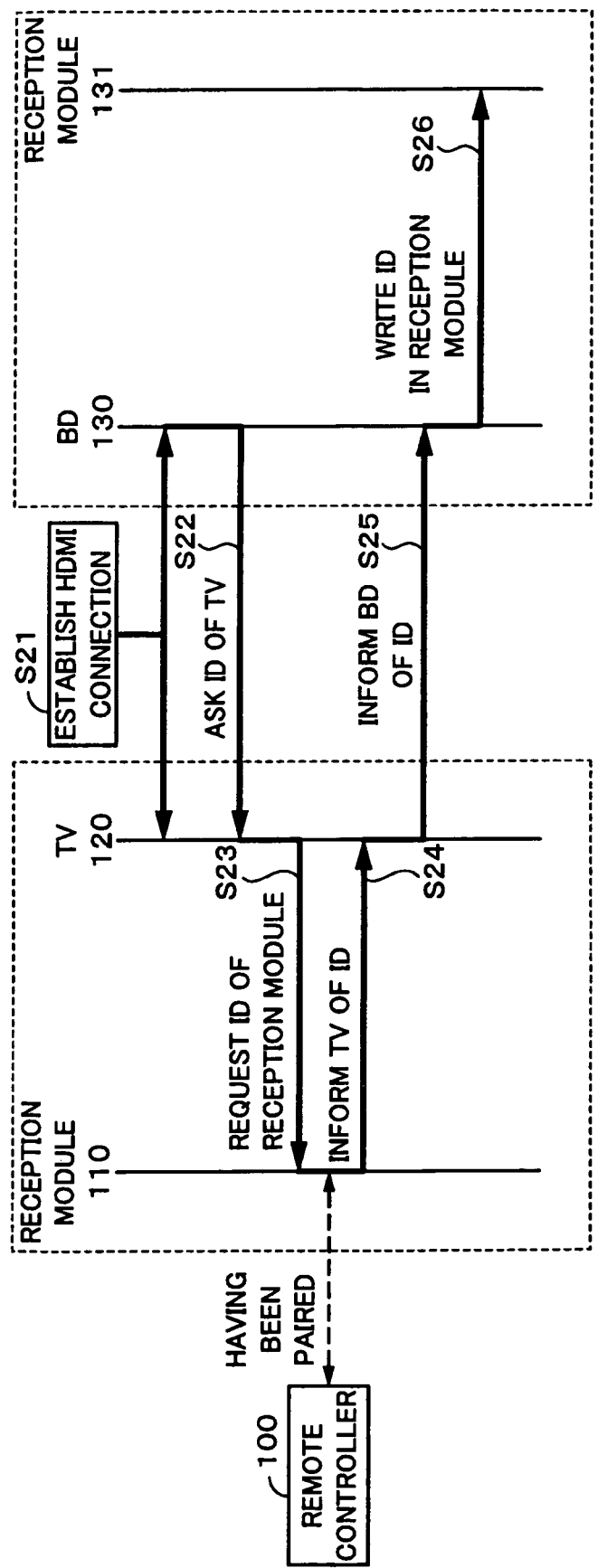

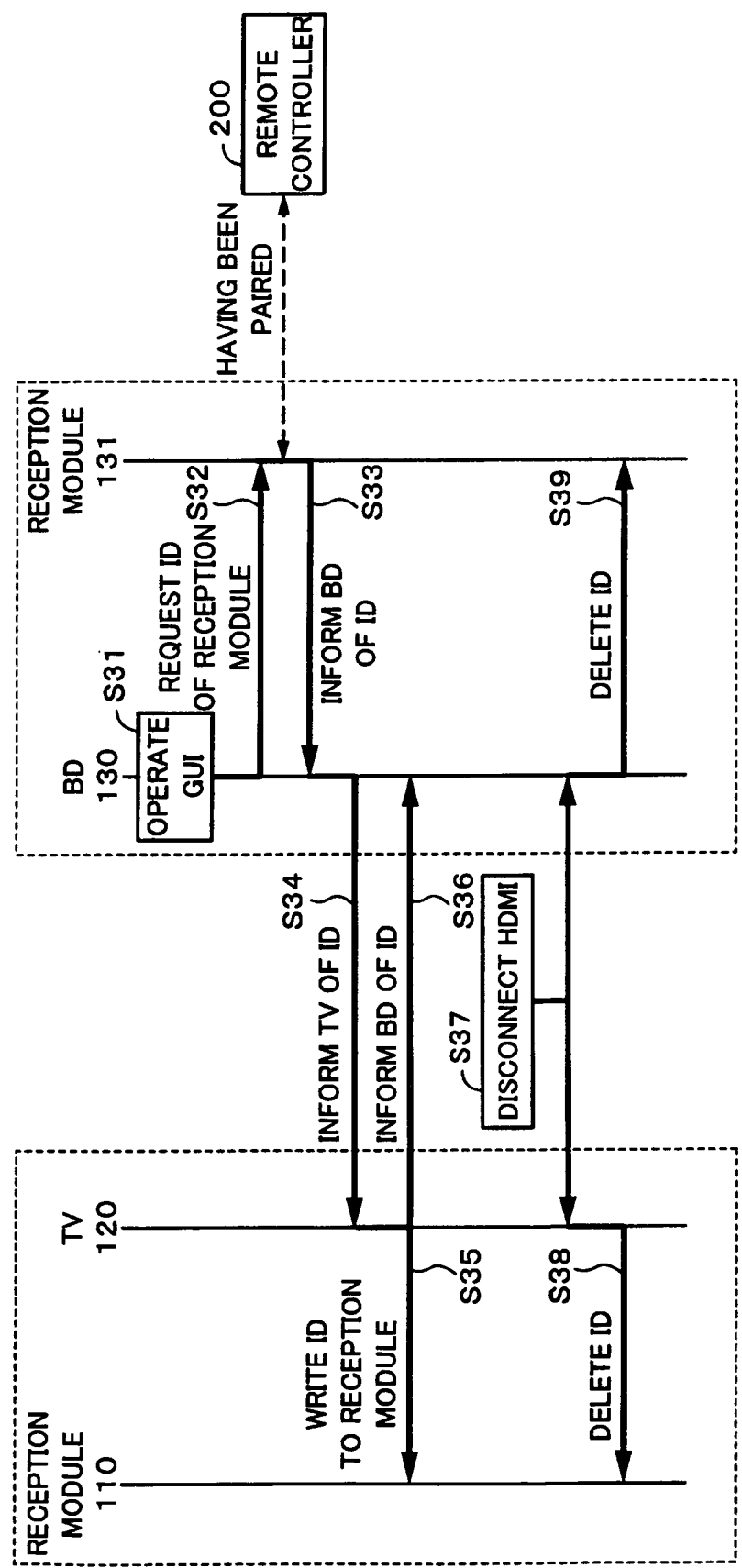

REMOTE CONTROLLING APPARATUS, RECEPTION APPARATUS, AND REMOTE CONTROL METHOD

CROSS REFERENCES TO RELATED APPLICATIONS

The present application claims priority from Japanese Patent Application No. JP 2008-024337, filed in the Japanese Patent Office on Feb. 4, 2008, the entire content of which is incorporated herein by reference.

BACKGROUND OF THE INVENTION

1. Field of the Invention

The present invention relates to a remote control apparatus and a remote control method applied to remote controlling for electronic devices, for example, based on a radio communication system.

2. Description of the Related Art

To remotely control an in-home apparatus under control, for example, a television receiver, when 2.4 GHz band Industrial, Scientific and Medical (ISM) use band is used, as its advantages, it is less affected by shadings and has longer range than an infrared system. In addition, since the reception side returns an acknowledge to the controller side, even if it fails to communicate with the reception side, it retransmits a control signal to the reception side. As a result, the user's operation can be securely transmitted to the reception side.

Such a remote control apparatus may control apparatus disposed in an adjacent room or a next door house without user's intension. Thus, when the user purchases and sets up a television receiver, it is necessary to correlate the remote control apparatus (hereinafter referred to as the remote controller) and the television receiver to allow the user to control the television receiver (this operation is referred to as pairing). Pairing means exchanging of identification information (ID) of the remote controller and that of the electronic device under control. An ID is an address that identifies an electronic device. The same ID may be used for the same group ID (referred to as a group ID). An ID is for example, a 64-bit extended unique identifier (EUI64) or a message authentication code (MAC) address that is assigned when the electronic device is produced or one created from a MAC address or the like.

In the past, pairing was automatically performed when the user purchased a television receiver. In other words, the television receiver enters a pairing acceptance state within a predetermined period after the power of the television receiver is initially turned on. The television receiver displays a message that indicates that it is registering the remote controller on its display. When a battery is initially attached to the remote controller that has not been used and a key is pressed, it automatically transmits a pairing request. After pairing is complete, the television receiver displays a message that indicates that pairing has been complete is displayed. Thus, when the power of the television receiver is turned on, the battery is attached to the remote controller, and then its key is initially pressed, pairing is complete. If such initial pairing fails, a regular pairing process is performed.

For example, Japanese Patent Laid-Open Publication No. 2006-135930, hereinafter referred to as Patent Document 1, discloses a technique about pairing. In this technique, when an image capturing apparatus and a receiver are paired and a video signal and an audio signal are radio transmitted therebetween, the image capturing apparatus captures a unique information code that represents the receiver and obtains the unique information code such that pairing can be easily performed. However, since the technique disclosed in Patent Document 1 used an image capturing apparatus, it was not suitable to a remote control system for a television receiver.

SUMMARY OF THE INVENTION

In the pairing method automatically performed when an device is initially set up, if a plurality of television receivers are simultaneously set up, for example, in an electric appliance store or an event site and a remote controller is paired with a desired television receiver, it is necessary to manage power-on operations of the television receivers. In other words, only the power of the television receiver to be paired with the remote controller is necessary to be turned on and then a battery is necessary to be attached to the remote controller. In other words, there was a problem in that a remote controller and a desired television receiver were not paired unless such attention was paid.

In view of the foregoing, it would be desirable to provide a remote control apparatus, a reception apparatus, and a remote control method that can easily perform pairing when a plurality of electronic devices are simultaneously set up.

According to an embodiment of the present invention, there is provided a remote control apparatus which radio transmits a control command from a remote controller to a reception apparatus connected to an electronic device which is an apparatus under control. The reception apparatus stores a first identification information which represents a destination remote controller. When the remote controller issues a pairing start command, the remote control apparatus transmits a pairing request containing second identification information of the remote controller itself. The reception apparatus extracts the second identification information from the received pairing request and decides that the remote controller is a pairing party if the first identification information matches the second identification information. The reception apparatus transmits a pairing response containing third identification information of the reception apparatus itself to the remote controller.

The first identification information which represents the destination remote controller has been stored in a non-volatile memory.

It is preferred that identification information which represents another destination remote controller be capable of being stored in addition to the first identification information.

It is preferred that the first identification information which represents the destination remote controller be stored when another electronic device is connected.

It is preferred that the stored first identification information which represents the destination remote controller be automatically deleted when the other electronic device is disconnected.

It is preferred that the remote controller transmit the pairing request when a battery is attached to the remote controller.

It is preferred that the reception apparatus be capable of receiving the pairing request within a limit time which starts after a power of the electronic device is initially turned on.

The remote controller inserts a code which represents a type of a designation electronic device into the pairing request. The reception apparatus extracts the code from the pairing request and decides the remote controller as a pairing party if the extracted code represents the type of the electronic device itself.

According to an embodiment of the present invention, there is provided a reception apparatus which is connected with an electronic device as an apparatus under control and which is used for a remote control apparatus which radio transmits a control command from a remote controller. The reception apparatus stores first identification information which represents a destination remote controller. When pairing starts, the reception apparatus receives a pairing request from the remote controller, the pairing request containing second identification information of the remote controller itself. The reception apparatus extracts the second identification information from the received pairing request and decides that the remote controller is a pairing party when the first identification information matches the extracted second identification information. The reception apparatus transmits a pairing response to the remote controller, the pairing response containing third identification information of the reception apparatus itself.

According to an embodiment of the present invention, there is provided a remote control method of radio transmitting a control command from a remote controller to a reception apparatus which is connected with an electronic device as an apparatus under control. The reception apparatus stores first identification information which represents a destination remote controller. The remote controller transmits a pairing request containing second identification information of the remote controller itself when the remote controller issues a pairing start command. The reception apparatus extracts the second identification information from the received pairing request and decide that the remote controller is a pairing party when the first identification information matches the extracted second identification information. The reception apparatus transmits a pairing response to the remote controller, the pairing response containing third identification information of the reception apparatus itself.

According to embodiments of the present invention, when an electronic device, for example a television receiver, and a remote controller are paired, in an environment of which a plurality of television receivers are set up, a desired television receiver can be easily paired with a remote controller.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a flow chart describing a pairing process according to an embodiment of the present invention;

FIG. 6 is a flow chart describing a process of which an ID of a remote controller is transmitted from a television receiver to a Blu-ray disc recorder; and FIG. 7 is a flow chart describing a process of which an ID of a remote controller is transmitted from a Blu-ray disc recorder to a television receiver.

DETAILED DESCRIPTION OF THE PREFERRED EMBODIMENTS

Next, with reference to the accompanying drawings, embodiments of the present invention will be described. Although these embodiments that will be described in the following are preferred ones of the present invention and various technically preferably limitations are imposed thereto, it is appreciated that the scope of the present invention is not limited to these embodiments unless described that they impose the present invention.

An embodiment of the present invention is applied to a remote control apparatus system that remotely controls an in-house electronic device, for example a television receiver. The remote control apparatus system is composed of one remote control apparatus (remote controller), which transmits remote control data (hereinafter referred to as a command) according to a user's operation, and at least one apparatus under remote control (a communication section and an electronic device), which receives a transmitted command and performs a designated operation.

The electronic device includes an AV device such as a television receiver, a video record/reproduction apparatus (specifically, a digital versatile disc (DVD) player, a disc recorder, a video cassette recorder (VCR)), audio record/reproduction apparatus (specifically, a CD player, an MD recorder, an audio amplifier, an FM tuner), a home electronic device such as a refrigerator. The remote control apparatus is driven by a built-in power supply. The apparatus under remote control is driven, for example, by a commercial power supply.

Figure 1A:
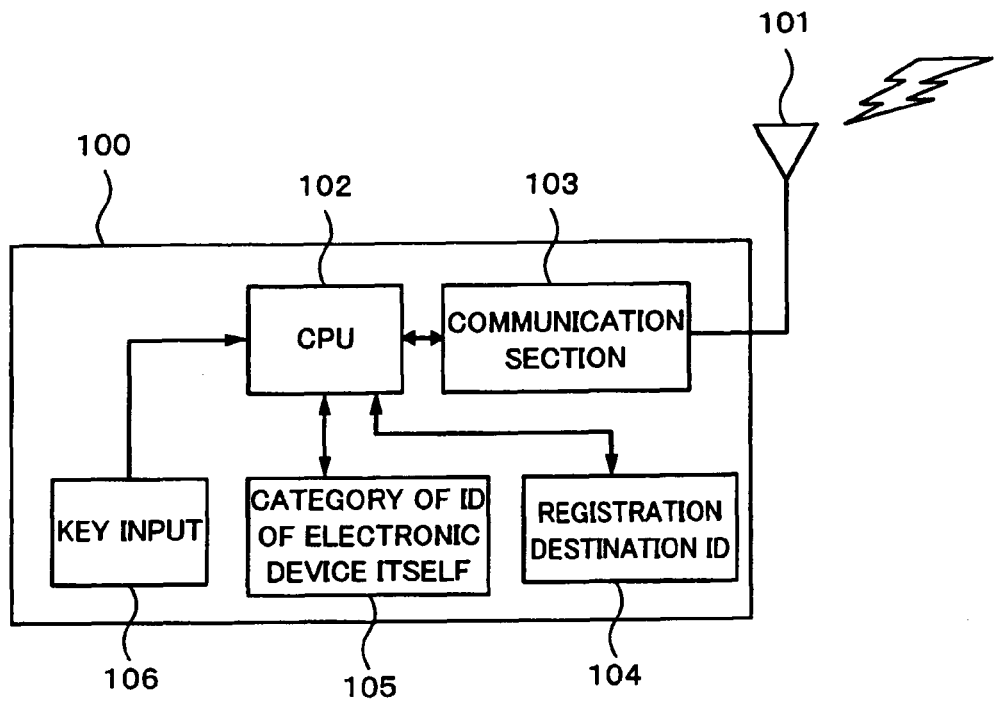
FIG. 1A and FIG. 1B are block diagrams showing structures of a remote controller and a reception module according to an embodiment of the present invention.

As shown in FIG. 1A, a remote controller 100 has an antenna 101 that transmits and receives a radio wave; a microprocessor (hereinafter referred to as the central processing unit (CPU)) 102 as a control section that performs a communication function and read/write operations for a storage medium and executes programs according to various key inputs; a communication section 103 that performs radio communication; a storage medium 104 that stores identification information ID of a pairing party; a storage medium 105 that stores an ID of the remote controller 100 and a category code of an electronic device with which the remote controller 100 initially pairs, and a key input section 106 that has keys. The storage medium 104 and the storage medium 105 each are composed of a writable non-volatile memory. The CPU 102 has a read-only memory (ROM), a random access memory (RAM), and so forth and totally controls each section of the remote controller 100 by executing programs stored in the ROM and so forth.

Identification information may be for example, an 64-bit extended unique identifier, which is an ID equivalent to a MAC address. When pairing operation and regular communication are performed, identification information is used as sender information and recipient information. In this case, instead of directly transmitting and receiving an ID, as defined in communication standards, for example, IEEE 802.15.4, an address created from an 8-byte long unique ID (this ID is referred to as a short address or the like). In this specification, however, identification information is generally referred to as identification information ID unless these unique ID and addresses are necessary to be distinguished.

EUI 64 is 64-bit identification information assigned to an interface of a communication device. Although the remote controller 100 is packaged along with an electronic device, for example a television receiver, the remote controller 100 may be one that can be used to control other electronic devices instead of one that is dedicated for the television receiver. As will be described later, in an automatic pairing process triggered by turning on the power of the electronic device, the storage medium 105 has stored a category code of an electronic device with which the remote controller 100 is to be initially paired.

Category codes that represent the categories of electronic devices may be existing product codes, for example, Japanese Article Number (JAN) codes or originally designated codes. In addition, along with a category code, a manufacturer code that represents a manufacturer name may be used to finely identify a category of an electronic device.

Figure 1B:
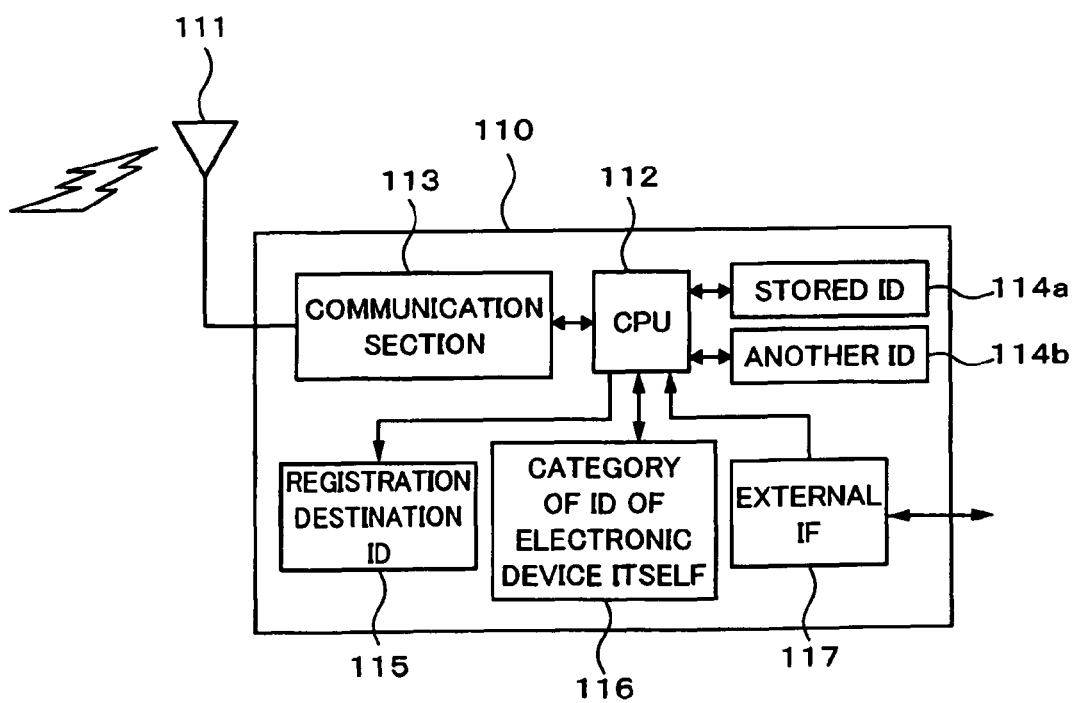

As shown in FIG. 1B, a reception apparatus 110 (hereinafter referred to as the reception module) of the remote control system has an antenna 111 that transmits and receives a radio wave; a CPU 112 that performs a communication function and read/write operations for a record medium and executes programs according to various key inputs; a communication section 113 that performs radio communication; a storage medium 116 that stores an ID based on EUI 64 and a category code of the reception apparatus 110 (for example, a code that represents a category of a television receiver); and an external interface 117 that detects a power state of the externally connected device, for example a television receiver, and informs the CPU 112 of the detected state. The CPU 112 totally controls each section of the reception module 110.

In addition, the reception module 110 has a storage medium 114a in which an ID, for example, a unique ID (EUI 64), of a pairing party (destination remote controller) has been written. In addition, the reception module 110 has a writable memory 114b that can store a unique ID of another remote controller other than that packaged along with an electronic device, for example a television receiver. Instead, the reception module 110 may have more memories. When another remote controller assigned the unique ID written in the memory 114b is paired with the television receiver, it can be operated by the other remote controller. The storage mediums 114a, 114b, 115, and 116 each are composed of a non-volatile memory.

Next, a process that pre-stores the ID of the remote controller 100 to the storage medium 114a will be described. The factory for the television receiver (reception module 110) may not be the same as that for the remote controller 100. The remote controller 100 may be delivered as a final product to the factory for the television receiver. In this case, it is necessary to write the ID of the remote controller 100 to the storage medium 114a.

When the remote controller 100 is produced, a microcomputer that performs a verification process and so forth of the remote controller 100 reads the ID stored in the storage medium 105 of the remote controller 100, for example, through a universal asynchronous receiver transmitter (UART). A QR code is printed on a seal based on the ID that has been read. The seal is adhered on the main body of the remote controller 100. The remote controller 100 with the ID is shipped. In the assembling factory for the television receiver, the QR code of the remote controller 100 is read and written to the storage medium 114a of the reception module 110 through UART.

The communication section 103 of the remote controller 100 and the communication section 113 of the reception apparatus 110 bidirectionally communicate with each other according to a predetermined radio communication system. The communication system is, for example, IEEE 802.15.4. The reception apparatus 110 has a function that outputs a command received through the radio remote control to the connected electronic device, for example, a television receiver.

Next, with reference to a flow chart shown in FIG. 2, a pairing operation according to an embodiment of the present invention will be described. The left side of FIG. 2 shows a flow of the processes of the remote controller 100. The right side shows a flow of the processes of the reception module 110 disposed in an electronic device under control, for example, a television receiver. The processes on the remote controller 100 are executed under control of the CPU 102, wherein the processes on the reception module 110 are executed under the CPU 112.

When a battery is initially attached to the remote controller 100 at step S1, the CPU 102 reads the ID and the category code of the remote controller 100 itself from the storage medium 105. Thereafter, the CPU 102 creates a pairing request frame (also referred to as a packet) that indicates that the ID of the remote controller 100 is a sender. At step S2, the remote controller 100 broadcasts the pairing request frame to all reception modules through the communication section 103 and the antenna 101.

The pairing request frame is not recipient specific and can be received by all reception modules in the range of the radio wave. The pairing request frame contains the ID of the remote controller 100 itself as the sender and the category code that indicates that the electronic device under control is a television receiver. Although the electronic device under control can be designated by a key operation, an initial code such as battery attachment has been set up, for example, in the television receiver.

One frame is generally composed of a header and a payload. The header contains a sender ID, a recipient ID, and so forth. The payload contains a command ID that represents the type of a command and a command itself. A pairing request frame and a pairing request response frame are identified by their command ID. These frames for pairing are not necessary to contain a command for an electronic device. A payload of a frame transmitted from the remote controller 100 to the television receiver after pairing has become successful contains a command ID and a command itself. A signal format for commands is the same as that for exiting infrared remote controllers.

A power is supplied from the television receiver to the reception apparatus 110. When the user turns on the power of the television receiver at step S11, the CPU 112 is informed through the external interface 117 that the power mode has been changed from the off state to the on state. The reception module 110 can receive a pairing request for a predetermined period, for example 60 minutes after the power of the television receiver has been turned on. At step S12, the reception module 110 receives a pairing request frame.

The reception module 110 determines whether or not the pairing request frame received from the remote controller 100 satisfies pairing permission conditions. One of the pairing permission conditions is whether or not a pairing request frame has been transmitted from a remote controller relatively close to the reception module 110. For example, the reception module 110 calculates a link quality indicator (LQI) according to the intensity of the received signal itself and the intensity of noise interference. LQI is defined in the physical layer of IEEE 802.15.4 and is represented by a value of digital data based on error rate. At step S13, it is determined that the value of LQI satisfy a pairing permission condition. Instead of the value of LQI, information of the field intensity of the received signal may be used.

At step S14, the reception module 110 checks for the category code of the received pairing request frame and determines whether or not it matches the category code of the reception module 110 itself. In this case, since the category code of the transmission frame represents a television receiver, the reception module 110 determines that they match. At step S14, the reception apparatus 110 also determines whether or not a predetermined ID of the remote controller, written in the storage medium 114a of the reception module 110, matches the ID of the received pairing request frame.

When the conditions that the value of LQI is sufficiently large and that the category code and the ID (unique ID) of the received pairing request frame match those that have been set up for the reception module 110, the flow advances to step S16. At step S16, the CPU 112 writes the ID of the remote controller 100 (destination remote controller) to the storage medium 115. Thereafter, the CPU 112 reads the own ID from the storage medium 116 and creates a pairing response frame containing the ID of the reception module 110 itself and the ID of the registration destination (remote controller 100). The pairing response frame is transmitted through the communication section 113 and the antenna 111.

At step S3, the remote controller 100 receives the pairing response frame and stores the extracted ID of the reception module 110 as the registration destination ID to the storage medium 104. At step S4, the remote controller 100 transmits an acknowledge to the reception module 110. At step S5, the remote controller 100 completes pairing. At step S17, the reception module 110 receives an acknowledge. At step S18, the reception apparatus 110 completes pairing. Instead, at step S18 or later, the reception module 110 may transmit a pairing completion notification to the remote controller 100. When the remote controller 100 receives the completion notification, it may determine that the remote controller 100 side has completed pairing.

In the foregoing processes, the ID of the remote controller 100 and the ID of the reception apparatus 110 have been registered as other party's ID. Thereafter, commands are exchanged in the pairing state that the parties have been identified.

The communication section 103 of the remote controller 100 and the communication section 113 of the reception module can perform bidirectional radio communication according to the same radio communication system. As the radio communication system, the physical layer of Institute of Electrical and Electronics Engineers (IEEE) 802.15.4 can be used. IEEE 802.15.4 is the name of a short range radio network standard referred to as the personal area network (PAN) or wireless (W) PAN.

The communication rate of this standard is from several 10 kbps to several 100 kbps and the communication distance ranges from several 10 m to several 100 m. Communication is made frame by frame. One frame is composed of a maximum of 133 bytes of a payload (0 to 127 bytes) and a header (6 bytes). In this communication system, a plurality of transmission and reception forms can be used. In the remote control system according to an embodiment of the present invention, the simplest method is used. Namely, the remote control apparatus transmits a command to the apparatus under remote control and receives a response therefrom. Instead, a more complex transmission/reception system may be used. According to an embodiment of the present invention, another bidirectional radio system other than the foregoing radio system may be used.

Figure 3:
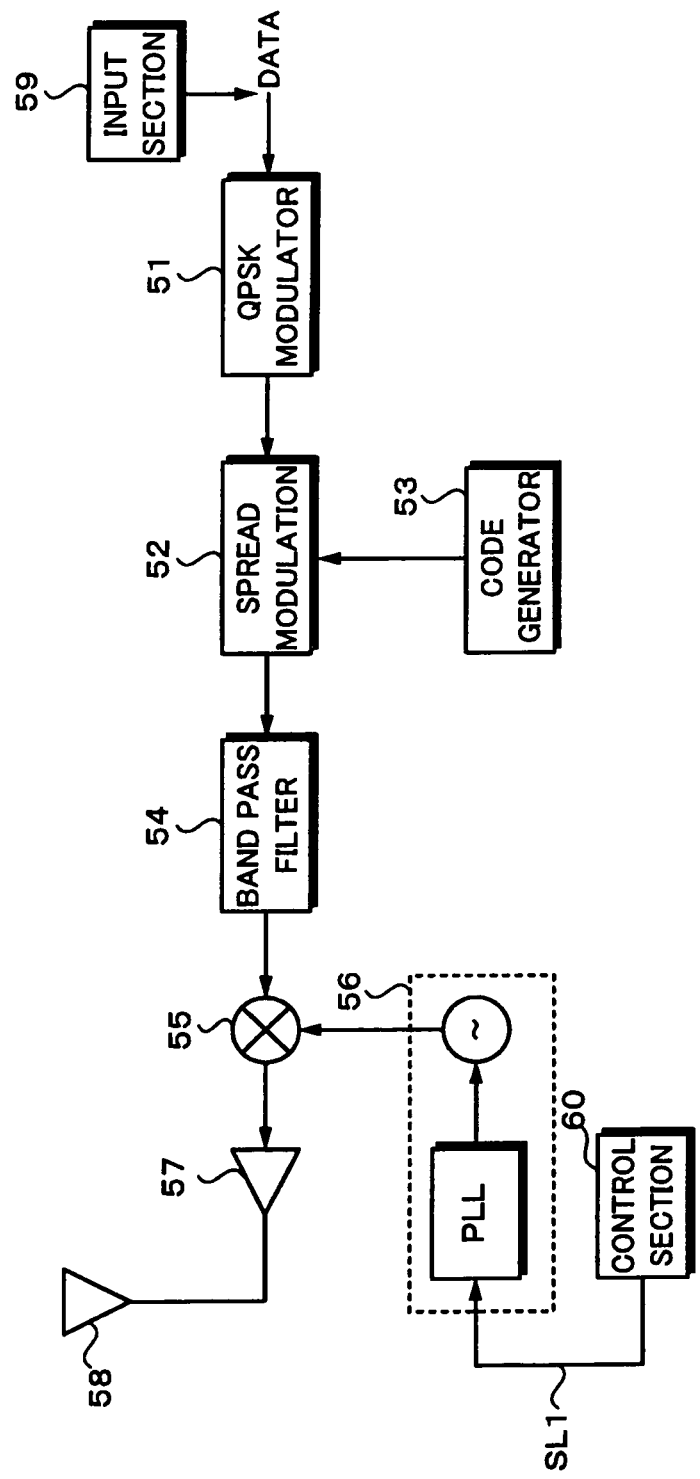
FIG. 3 is a block diagram showing a structure of a transmission side for remote controlling.

FIG. 3 shows the structure of the transmitter. Transmission data are supplied to a quadrature phase shift keying (QPSK) modulator 51. The QPSK modulator 51 modules the transmission data according to QPSK. An output signal of the QPSK modulator 51 is supplied to a spread modulator 52. A spread code generated by a code generator 53 is supplied to the spread modulator 52. The spread modulator 52 spreads the input signal according to the direct sequence spread spectrum (DSSS) system. The spread code may be a pseudo noise sequence. Direct spread (DS) system is a spectrum spread (SS) system in which data are phase-modulated with a high speed spread code and the spectrum of the signal is spread.

An output signal of the spread modulator 52 is supplied to a multiplying device 55 through a band pass filter 54. A PLL structured local oscillator 56 supplies a local oscillation signal to the multiplying device 55. The multiplying device 55 generates a transmission signal that has been up converted into a 2.4 GHz frequency band. The transmission signal is supplied to an antenna 58 through an amplifier 57. By controlling the gain of the amplifier 57, the transmission output can be changed.

16 communication channels have been set up from 2.405 GHz to 2.480 GHz at 5 MHz increments, namely 2.405 GHz, 2.410 GHz, 2.415 GHz, ..., and 2.480 GHz. In this embodiment, a plurality of channels, for example three channels, that do not overlap with those more likely used for radio LAN. A channel is set up based on a local oscillation frequency at which a local oscillator 56 outputs channel selection signal SL1. Selection signal SL1 is output from a control section 60.

The control section 60 is a microcomputer composed, for example, of a central processing unit (CPU), a read-only memory (ROM), a random access memory (RAM), and so forth. By executing programs stored in the ROM or the like, the control section 60 totally controls each section of the transmitter.

The transmitter of the remote controller 60 has an input section 59 including keys, switches, buttons, and/or a touch panel used for remote control. A command according to an operation of the input section 59 is transmitted to an electronic device. When the electronic device has correctly received a command, it transmits its response to the remote controller.

Figure 4:
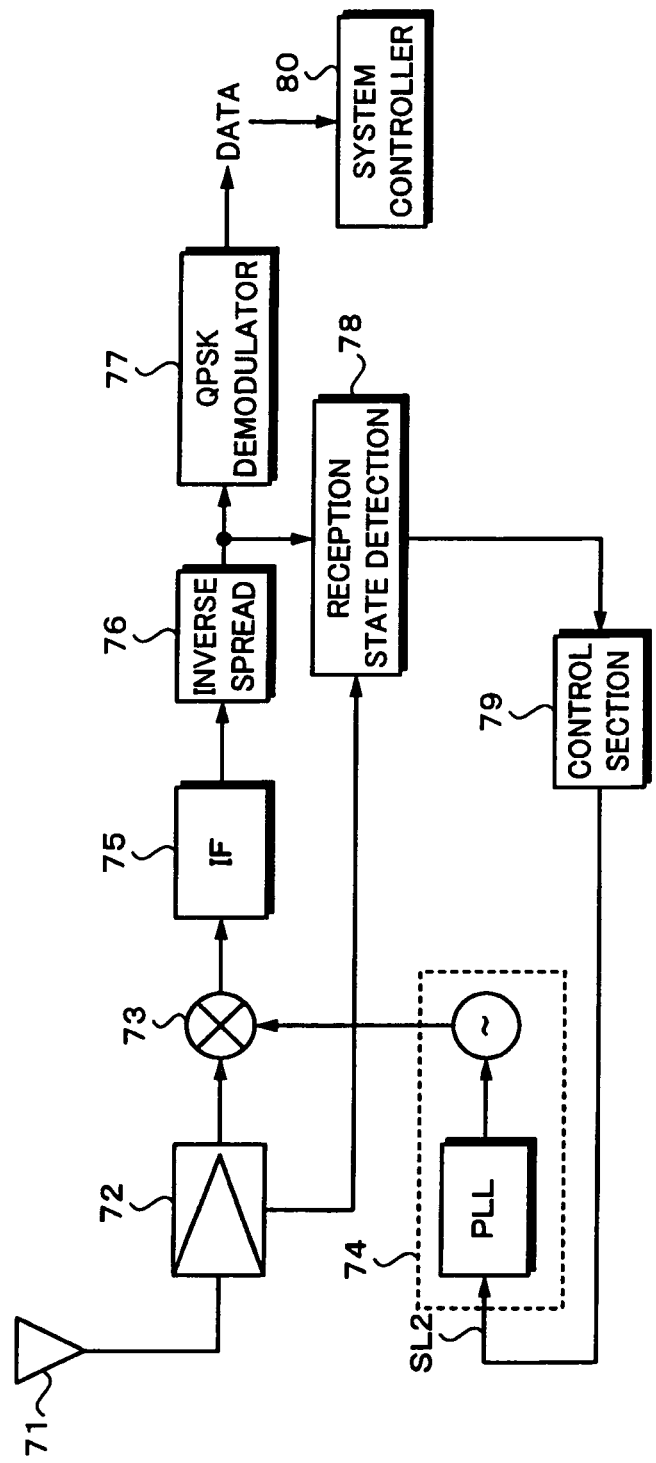
FIG. 4 is a block diagram showing a structure of a reception side for remote controlling.

FIG. 4 shows the structure of the receiver. A signal received by an antenna 71 is supplied to a low noise amplifier (LNA) 72. The antenna 71 is shared with the antenna 58 of the transmitter. One of the transmitter and the receiver is selected by a transmission/reception switch. An output signal of the LNA 72 is supplied to a multiplying device 73. A local oscillation signal is supplied from a PLL local oscillator 74 to the multiplying device 73. The multiplying device 73 generates a down-converted intermediate frequency (IF) signal.

The IF signal is supplied to an inverse spread section (spread demodulation section) 76 through an intermediate frequency amplifier 75. The inverse spread section 76 correlates a reception signal with a reference spread code generated on the reception side to demodulate the reception signal. Unless the timing of the reception signal does not accurately match the timing of the reference spread code, the inverse spread section 76 is difficult to obtain a correct correlation value. When communication starts, the reception side searches for timing between the reception signal and the reference spread code and holds the searched timing. To search for the timing, a correlator such as a matched filter is used.

A demodulation signal of the inverse spread section 76 is supplied to a QPSK demodulator 77. The QPSK demodulator 77 demodulates the input signal according to QPSK. The QPSK demodulator 77 outputs reception data. The electronic device receives a command as reception data. The command is supplied to a system controller 80 of the electronic device. On the other hand, the remote controller receives a response as reception data. The received response is supplied to a control section 79.

The control section 79 is a microcomputer composed, for example, of a central processing unit (CPU), a read-only memory (ROM), a random access memory (RAM), and so forth. By executing programs stored in the ROM or the like, the control section 79 totally controls each section of the receiver. Specifically, the control section 60 of the transmitter and the control section 79 of the receiver have the same structure.

Both a demodulation signal supplied from the inverse spread section 76 and an output signal supplied from the LNA 72 are supplied to a reception state detection section 78. When the reception state detection section 78 receives a frame, for example, a pairing request signal, the reception state detection section 78 calculates a link quality indicator (LQI) based on the intensity of the signal itself and the intensity of the noise interference. LQI is defined in the physical layer of IEEE 802.15.4 and represents a value of digital data based on an error rate. LQI is supplied to the control section 79. Along with a response, LQI calculated by the reception state detection section 78 of the receiver of the electronic device is transmitted to the remote controller.

Channel section signal SL2 generated by the control section 79 controls the local oscillator 74, for example, selects a channel having a predetermined frequency less affected by an interference wave of a microwave oven.

Figure 5A:
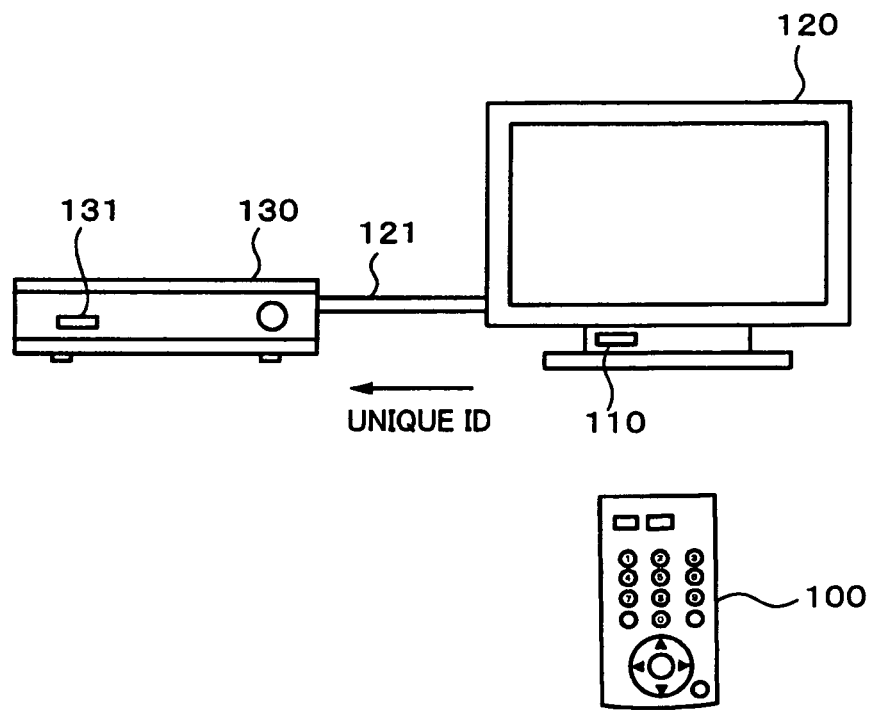
FIG. 5A and FIG. 5B are schematic diagrams describing a specific example of an environment in which a remote control system according to an embodiment of the present invention is applied.
Figure 5B:
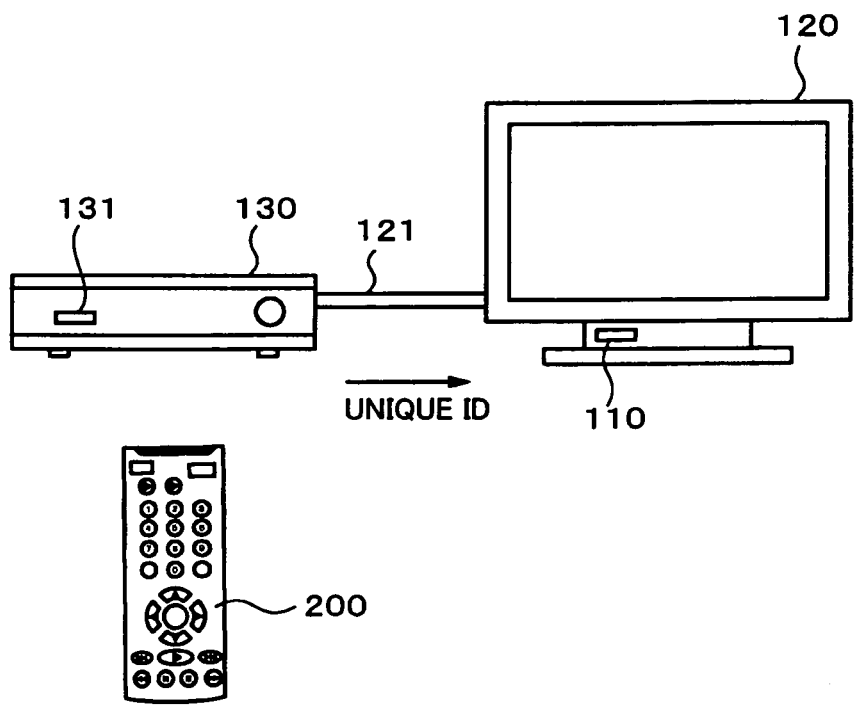

FIG. 5A and FIG. 5B show an example of an audio visual system (audio visual environment) according to an embodiment of the present invention. A reception module 110 (see FIG. 1B) is connected to a television receiver 120. The reception module 110 supplies a received remote control signal to the system controller disposed in the television receiver 120 or transmits a transmission signal as a radio wave.

Another AV device is connected to the television receiver 120. For example, a Blu-ray disc recorder (denoted by BD in the drawing) 130 is connected to the television receiver 120 through a high-definition multimedia interface (HDMI) cable 121. HDMI is specifications for an interface of base-band video data, audio data, and so forth. In HDMI, a mutual device control function referred to as the customer electronics control (CEC) is defined. When the Blu-ray disc recorder 130 starts reproducing with this function, the television receiver 120 can be controlled to automatically display the reproduced video image.

A storage medium of the reception module 110 of the remote control system mounted on the television receiver 120 has stored an ID (unique ID) of the remote controller 100 to be paired. Thus, as described above, when the power of the television receiver 120 is turned on and the battery is attached to the remote controller 100, they can be paired.

A reception module 131 that is the same as the reception module 110 is mounted on the Blu-ray disc recorder 130. To cause the remote controller 100 to remotely control the Blu-ray disc recorder 130, it is necessary to pair the remote controller 100 and the reception module 131 of the Blu-ray disc recorder 130. The remote controller 100 has for example device designation buttons. When a disc recorder is designated by a device designation button, the remote controller 100 can control the Blu-ray disc recorder 130 through the reception module 131.

The registration destination ID (the ID of the remote controller 100) that has been stored in the storage medium 114a of the reception module 110 is transferred to the Blu-ray disc recorder 130 using CEC of HDMI and then written in the storage medium of the reception module 131 of the Blu-ray disc recorder 130. Like the television receiver 120, the remote controller 100 and the reception module 131 of the Blu-ray disc recorder 130 are automatically paired.

For example, when the Blu-ray disc recorder 130 is initially connected to the television receiver 120 through the HDMI cable 121, the ID of the remote controller 100 is triggered to be transferred to the reception module 131 of the Blu-ray disc recorder 130. As an alternative method, after the Blu-ray disc recorder 130 is connected to the television receiver 120 through the HDMI cable 121, when a device designation button that designates the Blu ray disc of the remote controller 100 is initially pressed, the ID of the remote controller 100 is triggered to be transferred to the reception module 131 of the Blu-ray disc recorder 130. As another alternative method, the ID may be transferred to the Blu-ray disc recorder 130 by operating a graphical user interface (GUI) using a setup menu.

As shown in the flow chart of FIG. 6, at step S21, when HDMI connection is established, the flow advances to step S22. At step S22, the Blu-ray disc recorder 130 asks the television receiver 120 the unique ID of the remote controller 100 that has been paired. The television receiver 120 requests the reception module 110 to inform it of the ID (at step S23). At step S24, the reception module 110 informs the television receiver 120 of the ID.

At step S25, the television receiver 120 informs the Blu-ray disc recorder 130 of the ID through HDMI. The Blu-ray disc recorder 130 commands the reception module 131 to write the received ID. The reception module 131 writes the ID in a non-volatile memory. The reception module 131 has the same structure as the reception module 110 (see FIG. 1B) incorporated with the television receiver 120. However, the reception module 131 may not have a storage medium equivalent to the storage medium 114a that stores the unique ID of the destination remote controller. When the reception module 131 has stored the ID, the remote controller 100 can remotely control the Blu-ray disc recorder 130.

FIG. 5A shows an example in that an external device connected to the television receiver 120 through HDMI and the remote controller 100 paired with the reception module 110 of the television receiver 120 can be paired. Information transmitted by CEC may be only the unique ID of the remote controller 100.

FIG. 5B shows an example in which a remote controller 200 has been paired with the Blu-ray disc recorder 130 and a television receiver 120 connected to the Blu-ray disc recorder 130 through HDMI can be paired.

As shown in a flow chart of FIG. 7, for example, when a GUI operation is performed on the Blu-ray disc recorder 130 (at step S31), the Blu-ray disc recorder 130 is triggered to request of the reception module 131 the ID (at step S32). At step S33, the reception module 131 informs the Blu-ray disc recorder 130 of the unique ID of the remote controller 200 that has been paired. Pairing the reception module 131 and the remote controller 200 is not limited to a particular method. At step S34, the television receiver 120 is informed of the ID by the Blu-ray disc recorder 130 through HDMI.

At step S35, the television receiver 120 controls the reception module 110 to write the received ID. The received ID (the unique ID of the remote controller 200) is stored in a storage medium of the reception module 110. In this case, the Blu-ray disc recorder 130 is informed of the ID of the reception module 110 of the television receiver 120. As a result, the remote controller 200 can remotely control the television receiver 120. When HDMI is disconnected from the television receiver 120 at step S37, the television receiver 120 that has detected the disconnection issues a delete command for the ID written at step S35 to the reception module 110. Likewise, at step S36, the Blu-ray disc recorder 130 that has detected the disconnection issues a delete command for the ID written at step s36 to the reception module 131. In the sequence shown in FIG. 6, when HDMI is disconnected, the ID written at step S26 may be deleted.

When necessary, a process of deleting the ID of the destination remote controller 100 written in the reception module 110 may be provided.

It should be understood by those skilled in the art that various modifications, combinations, sub-combinations and alternations may occur depending on design requirements and other factors insofar as they are within the scope of the appended claims or the equivalents thereof. For example, the radio communication method may be a radio system other than IEEE 802.15.4. The television receiver and another AV device may be connected through a cable or a radio digital interface other than HDMI.

What is claimed is:

1. A remote control apparatus which radio transmits a control command from a remote controller to a reception apparatus connected to an electronic device which is an apparatus under control,
    wherein the reception apparatus stores a first identification information which represents a destination remote controller,
    wherein when the remote controller issues a pairing start command to start a pairing operation, the remote control apparatus transmits a pairing request containing second identification information identifying the remote controller itself,
    wherein the remote controller inserts a category code which represents a category of a designation electronic device into the pairing request, the category code being other than information identifying the electronic device itself and other than the second identification information,
    wherein the reception apparatus stores third identification information identifying the reception apparatus itself, the third identification information being other than the category code,
    wherein the reception apparatus extracts the second identification information from the received pairing request and extracts the category code from the pairing request, and decides, during the pairing operation, that the remote controller is a pairing party by determining whether the received pairing request satisfies predetermined conditions, wherein the received pairing request satisfies the predetermined conditions when a determination is the first identification information matches the extracted second identification information and the extracted category code matches a category code stored at the reception apparatus representing a category of the electronic device, and
    wherein the reception apparatus transmits a pairing response containing the third identification information, the third identification information being retrieved at the reception apparatus, when a determination during the pairing operation is that the received pairing request satisfies the predetermined conditions.

2. The remote control apparatus as set forth in claim 1,
    wherein the first identification information which represents the destination remote controller has been stored in a non-volatile memory.

3. The remote control apparatus as set forth in claim 2,
    wherein identification information which represents another destination remote controller is capable of being stored in addition to the first identification information.

4. The remote control apparatus as set forth in claim 1,
    wherein the first identification information which represents the destination remote controller is stored when another electronic device is connected.

5. The remote control apparatus as set forth in claim 4,
    wherein the stored first identification information which represents the destination remote controller is automatically deleted when the other electronic device is disconnected.

6. The remote control apparatus as set forth in claim 1,
    wherein the remote controller transmits the pairing request when a battery is attached to the remote controller.

7. The remote control apparatus as set forth in claim 1,
    wherein the reception apparatus is capable of receiving the pairing request within a limit time which starts after a power of the electronic device is initially turned on.

8. A reception apparatus which is connected with an electronic device as an apparatus under control and which is used for a remote control apparatus which radio transmits a control command from a remote controller,
    wherein the reception apparatus stores first identification information which represents a destination remote controller,
    wherein when a pairing operation starts, the reception apparatus receives a pairing request from the remote controller, the pairing request containing second identification information identifying the remote controller itself and a category code which represents a category of a designation electronic device, the category code being other than information identifying the electronic device itself and other than the second identification information,
    wherein the reception apparatus stores third identification information identifying the reception apparatus itself, the third identification information being other than the category code,
    wherein the reception apparatus extracts the second identification information from the received pairing request and extracts the category code from the pairing request, and decides, during the pairing operation, that the remote controller is a pairing party by determining whether the received pairing request satisfies predetermined conditions, wherein the received pairing request satisfies the predetermined conditions when a determination is the first identification information matches the extracted second identification information and the extracted category code matches a category code stored at the reception apparatus representing a category of the electronic device, and
    wherein the reception apparatus transmits a pairing response to the remote controller, the pairing response containing the third identification information, the third identification information being retrieved at the reception apparatus, when a determination during the pairing operation is that the received pairing request satisfies the predetermined conditions.

9. The reception apparatus as set forth in claim 8,
    wherein the first identification information which represents the destination remote controller has been stored in a non-volatile memory.

10. The reception apparatus as set forth in claim 9,
    wherein identification information which represents another destination remote controller is capable of being stored in addition to the first identification information.

11. The reception apparatus as set forth in claim 8,
    wherein the first identification information which represents the destination remote controller is stored when another electronic device is connected.

12. The reception apparatus as set forth in claim 11,
wherein the stored first identification information which represents the destination remote controller is automatically deleted when the other electronic device is disconnected.

13. The reception apparatus as set forth in claim 8,
wherein the reception apparatus is capable of receiving the pairing request within a limit time which starts after a power of the electronic device is initially turned on.

14. A remote control method of radio transmitting a control command from a remote controller to a reception apparatus which is connected with an electronic device as an apparatus under control, comprising the steps of:
- causing the reception apparatus to store first identification information which represents a destination remote controller;
- causing the remote controller to transmit a pairing request containing second identification information identifying the remote controller itself, when the remote controller issues a pairing start command to start a pairing operation;
- causing the remote controller to insert a category code which represents a category of a designation electronic device into the pairing request, the category code being other than information identifying the electronic device itself and other than the second identification information,
- wherein the reception apparatus stores third identification information identifying the reception apparatus itself, the third identification information being other than the category code;
- causing the reception apparatus to extract the second identification information from the received pairing request and extract the category code from the pairing request, and decide, during the pairing operation, that the remote controller is a pairing party by determining whether the received pairing request satisfies predetermined conditions, wherein the received pairing request satisfies the predetermined conditions when a determination is the first identification information matches the extracted second identification information and the extracted category code matches a category code stored at the reception apparatus representing a category of the electronic device; and
- causing the reception apparatus to transmit a pairing response to the remote controller, the pairing response containing the third identification information, the third identification information being retrieved at the reception apparatus, when a determination during the pairing operation is that the received pairing request satisfies the predetermined conditions.

15. The remote control method as set forth in claim 14,
wherein the first identification information which represents the destination remote controller has been stored in a non-volatile memory.

16. The remote control method as set forth in claim 15,
wherein identification information which represents another destination remote controller is capable of being stored in addition to the first identification information.

17. The remote control method as set forth in claim 14,
wherein the first identification information which represents the destination remote controller is stored when another electronic device is connected.

18. The remote control method as set forth in claim 17,
wherein the stored first identification information which represents the destination remote controller is automatically deleted when the other electronic device is disconnected.

19. The remote control method as set forth in claim 14,
wherein the pairing request is broadcast when a battery is attached to the remote controller.

20. The remote control method as set forth in claim 14,
wherein the reception apparatus is capable of receiving the pairing request within a limit time which starts after a power of the electronic device is initially turned on.

* * * * *